(12) United States Patent
Van Poucke

(10) Patent No.: US 11,191,294 B1
(45) Date of Patent: Dec. 7, 2021

(54) APPARATUS AND METHODS FOR MAKING FOOD PRODUCTS WITH IMPROVED HYDRAULIC CONTROLS

(71) Applicant: Ideal Snacks Corporation, New Liberty, NY (US)

(72) Inventor: Steven Van Poucke, Monroe, NY (US)

(73) Assignee: Ideal Snacks Corporation, Liberty, NY (US)

(*) Notice: Subject to any disclaimer, the term of this patent is extended or adjusted under 35 U.S.C. 154(b) by 162 days.

(21) Appl. No.: 16/523,654

(22) Filed: Jul. 26, 2019

Related U.S. Application Data

(63) Continuation-in-part of application No. 16/411,769, filed on May 14, 2019.

(51) Int. Cl.
| | |
|---|---|
| *A23P 30/32* | (2016.01) |
| *F15B 15/24* | (2006.01) |
| *F15B 11/042* | (2006.01) |
| *F15B 11/028* | (2006.01) |

(52) U.S. Cl.
CPC .......... *A23P 30/32* (2016.08); *F15B 11/0423* (2013.01); *F15B 15/24* (2013.01); *F15B 11/028* (2013.01)

(58) Field of Classification Search
None
See application file for complete search history.

(56) References Cited

U.S. PATENT DOCUMENTS

| | | |
|---|---|---|
| 3,231,718 A | 1/1966 | Vasile |
| 3,958,032 A | 5/1976 | Merriam |
| 3,978,236 A | 8/1976 | Sair et al. |
| 5,067,323 A * | 11/1991 | Bennett .................... F02C 9/54 60/734 |
| 5,102,677 A | 4/1992 | Van Den Berghe |
| 5,271,728 A | 12/1993 | Froidevaux |
| 5,467,693 A | 11/1995 | Van den Berghe |
| 5,660,098 A | 8/1997 | Van den Berghe |

(Continued)

FOREIGN PATENT DOCUMENTS

| | | |
|---|---|---|
| GB | 2502110 | 11/2013 |
| JP | 2004098580 | 4/2004 |

(Continued)

OTHER PUBLICATIONS

International Search Report and Written Opinion issued in PCT/US2020/032597 dated Aug. 5, 2020.

*Primary Examiner* — Ibrahime A Abraham
*Assistant Examiner* — Elizabeth M Sims
(74) *Attorney, Agent, or Firm* — Barnes & Thornburg LLP; G. Peter Nichols

(57) ABSTRACT

Apparatus and methods for making puffed food products are disclosed. In one implementation, an innovative process may include improved configurations and control of hydraulic drive cylinder(s) to more swiftly and precisely apply pressures to heatable mold elements during production of puffed food products. According to one particular implementation, in order to drive a first hydraulic piston to move at least one movable mold element to a desired position, a second hydraulic piston may be first positioned to set up an adjustable hard-stop based on the desired position, such that the first hydraulic piston may rapidly drive the moveable mold element to stop at precisely the desired position.

15 Claims, 11 Drawing Sheets

(56) References Cited

U.S. PATENT DOCUMENTS

| | | | |
|---|---|---|---|
| 6,153,242 | A | 11/2000 | Miyamoto et al. |
| 6,248,379 | B1 | 6/2001 | Capodieci et al. |
| 6,333,063 | B2 | 12/2001 | Ariga et al. |
| 6,468,573 | B1 | 10/2002 | Herrick et al. |
| 6,569,481 | B1 | 5/2003 | Malfait |
| 6,607,777 | B1 | 8/2003 | Walsh et al. |
| 6,632,465 | B1 | 10/2003 | Malfait |
| 7,135,201 | B2 | 11/2006 | Malfait |
| 7,521,078 | B2 | 4/2009 | Miller |
| 7,597,921 | B2 | 10/2009 | Walsh et al. |
| 7,666,460 | B1 | 2/2010 | Keogh |
| 7,770,513 | B2 * | 8/2010 | Van Poucke ............ A23P 30/32 99/349 |
| 7,918,157 | B2 | 4/2011 | Van Den Berghe |
| 8,161,871 | B2 | 4/2012 | Van Poucke |
| 8,191,467 | B2 | 6/2012 | Van Poucke |
| 8,227,005 | B2 | 7/2012 | Van Poucke |
| 2003/0215642 | A1 | 11/2003 | Carre et al. |
| 2004/0169313 | A1 | 9/2004 | Ferrachat et al. |
| 2013/0125767 | A1 | 5/2013 | Shoshan |
| 2013/0251877 | A1 * | 9/2013 | Levin ...................... A23L 19/19 426/559 |
| 2015/0359249 | A1 | 12/2015 | Matasovsky et al. |

FOREIGN PATENT DOCUMENTS

| | | |
|---|---|---|
| WO | 2009/137171 | 11/2009 |
| WO | 2016/176107 | 11/2016 |

* cited by examiner

APPARATUS AND METHODS FOR MAKING FOOD PRODUCTS WITH IMPROVED HYDRAULIC CONTROLS

CROSS-REFERENCE TO RELATED APPLICATIONS

The present application is a continuation-in-part of, and claims the benefit of, U.S. Utility application Ser. No. 16/411,769, titled "MULTIPLE-PRESS, MULTIPLE-EXPANSION APPARATUS AND METHODS FOR MAKING FOOD PRODUCTS," which was filed on May 14, 2019. The present application also relates to U.S. Utility application Ser. No. 10/504,444 (now U.S. Pat. No. 7,770,513), filed Aug. 12, 2004, which is a national stage application under 35 U.S.C. § 371 from PCT Application No. PCT/EP02/01674, filed Feb. 15, 2002. Each of the above-referenced related applications is incorporated herein by reference in its entirety.

FIELD

The present innovations generally relate to the manufacture of food products, and more particularly, are directed to apparatus and methods for making puffed food products with improved hydraulic controls.

BACKGROUND

In the past few decades, a strong trend emerged in the food industry to develop more nutritious and more healthy snacks. Health-conscious consumers increasingly demand food products that include lower fat content, offer more balanced amounts of protein and carbohydrates, or are generally more health-promoting than traditional snacks such as candies, chips, crackers, and the like. As a result, the food industry has attempted to tackle the challenges of making wholesome snack food products out of conventional or alternative ingredients and with less fat or sugar while maintaining or improving the taste and texture of such food products.

In the trend of healthy snacking, puffed snacks have become more and more popular due to their inherent lightness, crispy texture, and ability to accommodate flavoring. As one example, automatic machines for the making of rice crackers and similar puffed or popped granular cakes by pressure-baking and expanding a food-starch containing material in a heated mold are known from the prior art to exist in a number of distinct machine variants.

The present inventor previously disclosed an apparatus and related methods for making puffed food products from starch-containing raw materials. See U.S. Pat. No. 7,770, 513.

Referring to FIGS. 1A-1D, a prior-art sequence of mold position steps in the process of producing a puffed cereal wafer or cracker are shown. The mold comprises an upper mold 1 and a lower mold 2, both heatable by means of embedded heating elements (not represented) and movable upwardly and downwardly by being directly driven by hydraulic cylinders as illustrated and explained below. Upper and lower molds generally have punch elements (1', 2') which are slidably receivable in a ring mold 3 (preferably fixed but not always required) so as to form therewith a hermetically sealed molding cavity. In FIG. 1A the mold cavity is open, the lower mold 2 has been partially retracted within ring mold 3 while upper mold 1 is lifted, such that a food-starch containing raw material 4 may be dropped into the mold cavity.

FIG. 1B shows pressure-baking of raw material 4. The raw material 4 is crushed, compressed, and heated in a closed cavity by descending the upper mold into the ring mold and then pressurizing either one or both of upper and lower molds. The starch in the raw material is gelatinized, becomes amorphous, and moisture including chemically bound water of the raw material is driven off to build up a high internal vapor pressure.

The built-up vapor pressure is then suddenly released as shown in FIG. 1C by quickly retracting upper and/or lower punches relative to one another within the ring mold. As a result, the compressed raw material explosively expands to form a puffed or popped wafer filling the expansion chamber space defined between the upper mold, the lower mold, and the ring mold.

As shown in FIG. 1D the upper mold is in a lifted position again, whereas the lower punch is moved in the upward direction to raise the cracker to a discharge position flush with the upper surface of the ring mold. A sliding plate of the raw material feed system (not shown) can then push the puffed cracker from the raised lower mold surface into a discharge chute whereafter the baking-puffing cycle can start anew.

In FIGS. 2A-2B, overall side views of a prior-art puffing apparatus are shown comprising a multi-cracker mold, i.e., the upper and lower molds (1, 2) include a plurality of die punches (1', 2') which are slidably receivable in a plurality of corresponding die holes (not shown) of a stationary ring mold 3. Lateral to the apparatus there is mounted a raw material supply system 6 comprising a raw material supply line 7 (conduit or hopper) and sliding plates (8, 8') having suitable perforations and back plates to supply a desired amount of grain or pellet material to each die cavity of the ring mold. Power means (9, 9', 9"), e.g., air cylinders drive the plates in sliding movements relative to one another and to the ring mold. More in particular, a dosage mechanism (8') driven by cylinder (9') brings an exact amount of raw material from supply line (7') into a transport plate (8). The transport plate (8) is driven by cylinder (9) and positions the raw material precisely over each lower punch element (2') being then in a cup-forming feed position, i.e., received partly within ring mold openings (3'). Release plate (8") driven by cylinder (9") is then actuated to drop or release raw material from transport plate (8) into the ring mold cups or cavities.

On the back side of each movable mold, i.e., on top of upper mold 1 and at the bottom of lower mold 2, there is mounted an upper hydraulic cylinder 10 and a lower drive cylinder 11 respectively, both independently actionable in the respective upward and downward direction to raise or descend the mold elements over a precisely controlled distance and/or to transmit molding pressure to the raw material in the mold cavity according to the desired process stages.

Mounting plates (10', 11') attached to apparatus frame (12) form support and fixation members for top and bottom hydraulic cylinders (10, 11) and also bear and guide the connection thereof with the movable mold elements (1, 2). The hydraulic cylinders are powered by a hydraulic oil circuit.

The prior-art process for making puffed food products is illustrated in the flow chart in FIG. 3 with the following steps: (S1) Cup Time: bottom cylinder retracts (goes down), and retracted punches of lower mold form feeding cups within ring mold dies to allow raw material to be dropped into the mold; (S2) Start Time: top cylinder extends (goes down), and upper mold punch goes down inside ring mold die; (S3) Press Time: bottom cylinder extends, and lower mold punch is displaced upwardly, compressing the raw material between the two punches; (S4) Bake Time: all valves remain closed, while both cylinders and punches are kept stationary; (S5) Top Expansion: top cylinder retracts; (S6) Bottom Expansion: bottom cylinder retracts (mostly) simultaneously with top cylinder; (S7) Expansion Delay: delay time of expanded/puffed product inside the retracted punches or expansion-opened molds to allow shape control of finished product; (Optional) Thickness Control: bottom cylinder extends and recompresses already expanded product to a given extent, thereby controlling shape, thickness and surface flatness; (S8) Out Time: top cylinder retracts upper mold above ring mold, and bottom cylinder extends, so that lower mold punch pushes finished product out of ring mold. Thereafter, the cycle starts anew with Step S1 including the supply of starch-containing raw material into the mold cavities.

While the above-described prior-art technique has seen some commercial success in producing puffed food products, various new improvements on the method and/or apparatus are desirable in order to make the production more efficient, to ensure consistent and uniform quality, and to accommodate unique characteristics of a wide variety of ingredients or raw materials, for example.

SUMMARY OF THE INVENTION

Embodiments of the present invention make significant improvements upon prior-art techniques for making puffed food products. In one implementation, an innovative process may include improved configurations and control of hydraulic drive cylinder(s) to more swiftly and precisely apply pressures to heatable mold elements during production of puffed food products. According to one particular implementation, in order to drive a first hydraulic piston to move at least one movable mold element to a desired position, a second hydraulic piston may be first positioned to set up an adjustable hard-stop based on the desired position, such that the first hydraulic piston may rapidly drive the moveable mold element to stop at precisely the desired position.

According to one particular embodiment of the present invention, a pressure-molding apparatus for making a food product may comprise: at least one heatable mold which defines a mold cavity and has at least one movable mold element; a driving system, coupled to the at least one mold element, that is configured to move said at least one mold element to a desired position relative to the mold cavity by setting up at least one adjustable hard-stop based on said desired position and causing at least one first hydraulic piston to travel to and be stopped by said at least one adjustable hard-stop; a raw material supply system that transports raw materials into the mold cavity; and a control unit configured to control at least said driving system, said at least one heatable mold, and said raw material supply system to process said raw material into a puffed food product.

According to another particular embodiment of the present invention, a system for making a food product may comprise one or more pressure-molding apparatuses, where each of the pressure-molding apparatuses includes: at least one heatable mold which defines a mold cavity and has at least one movable mold element; a driving system, coupled to the at least one mold element, that is configured to move said at least one mold element to a desired position relative to the mold cavity by setting up at least one adjustable hard-stop based on said desired position and causing at least one first hydraulic piston to travel to and be stopped by said at least one adjustable hard-stop; a raw material supply system that transports raw materials into the mold cavity; and a control unit configured to control at least said driving system, said at least one heatable mold, and said raw material supply system to process said raw material into a puffed food product.

According to yet another particular embodiment of the present invention, a method for making a food product may comprise the steps of: (a) depositing a raw material into a mold cavity in at least one heatable mold, said mold comprising at least one movable mold element; (b) positioning said at least one movable mold element with respect to said mold cavity to compress said raw material; (c) baking said compressed raw material in said mold at a first temperature; (d) at least partially retracting said at least one movable mold element to allow said baked, compressed raw material to expand and take shape into a first intermediate food product; (e) re-positioning said at least one movable mold element with respect to said mold cavity to compress said first intermediate food product; (f) baking said first intermediate food product in said mold at a second temperature; and (g) at least partially retracting said at least one movable mold element to allow said baked, compressed first intermediate food product to expand and take shape into a second intermediate food product. At least one of Steps (b), (d), (e), and (g) may comprise setting up said at least one adjustable hard-stop and causing said at least one first hydraulic piston to travel to and be stopped by said at least one adjustable hard-stop.

Other benefits, advantages, or technical effects may be appreciated by those of ordinary skill in the art reading the disclosure herein and/or by practicing one or more embodiments of the present invention.

BRIEF DESCRIPTION OF THE DRAWINGS

The accompanying appendices, drawings, figures, images, etc. illustrate various exemplary, non-limiting, inventive aspects, embodiments, and features ("e.g.," or "example(s)") in accordance with the present disclosure.

DETAILED DESCRIPTION OF THE INVENTION

Embodiments of the present invention aim to build upon, and make significant improvements over, the above-described prior-art techniques for making puffed food products. In particular, while the inventor previously suggested an optional "Thickness Control" step of compressing the food item after an initial expansion, embodiments of the present invention teach a second press or compression coupled with a second heating/baking and expansion to more optimally configure the shape, moisture content, and texture of the final food product. The second cycle of compression, baking, and expansion may be controlled based on precisely measured and adjusted baking temperatures and/or compression pressures. According to further embodiments, a third cycle (or more) of compression, baking, and expansion may be added.

Figure 4A:
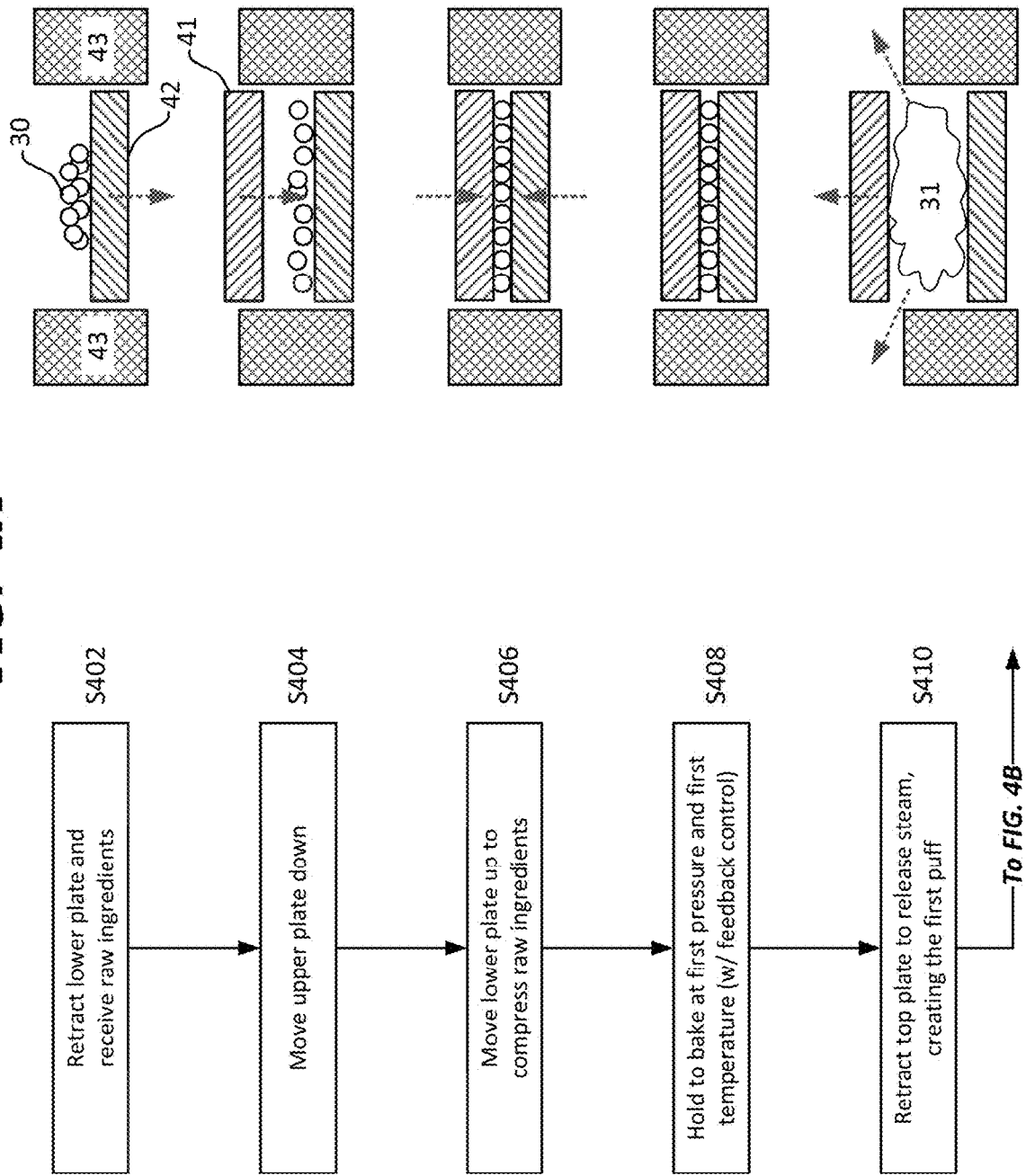
FIGS. 4A-4B show a flow chart illustrating an exemplary method for making puffed products and corresponding diagrams illustrating core components for implementing the method according to embodiments of the present invention.
Figure 4B:
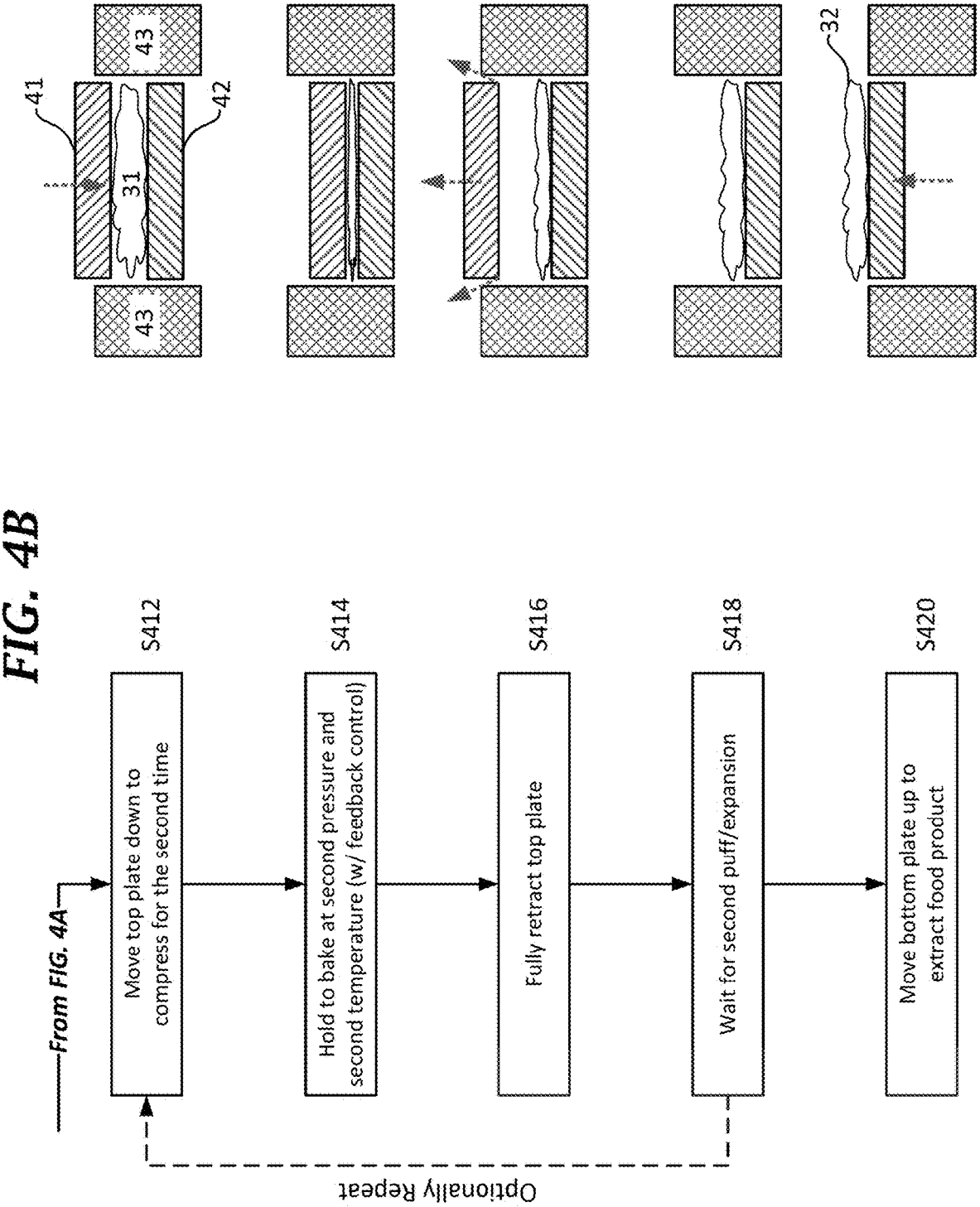

Referring to FIGS. 4A-4B, there are shown both a flow chart illustrating an exemplary method for making puffed food products and corresponding diagrams illustrating core components for implementing the method according to embodiments of the present invention.

In the illustrative diagrams, the cross-sectional view of a ring mold element 43 is shown along with an upper mold plate 41 and a lower mold plate 42 in respective positions depending on the corresponding steps or stages of the manufacturing process. It should be noted that these simplified illustrations of mold elements are intended to assist in the explanation of the numbered steps or stages of the exemplary food-making process; the present invention is not limited to the use of such mold elements or their exemplary configurations as shown in these drawings.

In Step S402, the lower plate 42 may be retracted in the ring mold element 43 to form a feed cup (or a hermetically sealed molding cavity) such that an appropriate amount of raw ingredients 30 may be deposited.

According to embodiments of the present invention, the raw ingredients may be or include one or more of the following: wheat, rye, maize (corn), rice, sago, sorghum, triticale, millet, beans, potatoes, or starches from these or similar sources. According to other embodiments, the raw ingredients may alternatively or additionally include protein-rich food materials or protein therefrom. Other alternative ingredients may include one or more of the following: whole pieces of beans and peas, such as green and yellow peas, black bean, garbanzo bean, chick peas; whole seeds, such as sesame, quinoa, and chia; extruded pellets, such as soy-based protein pellets, pellets containing dried fruits, and vegetable pellets made from spinach, carrots, or beet etc.

Figure 1A:
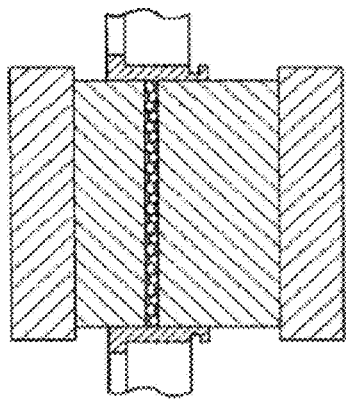
FIGS. 1A-1D are schematic illustrations of the main steps occurring in a prior-art process of making a puffed cracker using a stationary ring mold and respective upper and lower movable mold elements or punches.
Figure 1B:
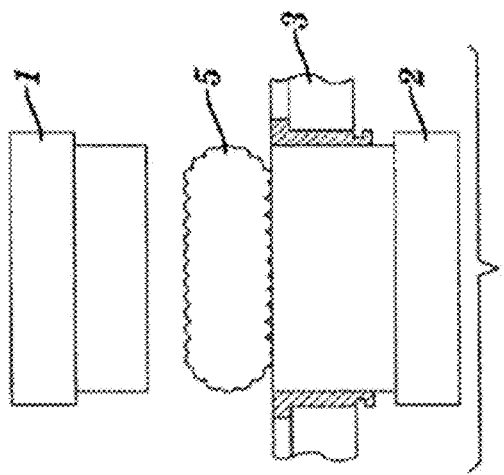
Figure 1C:
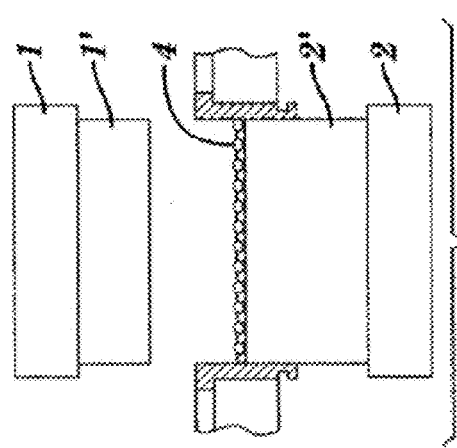
Figure 1D:
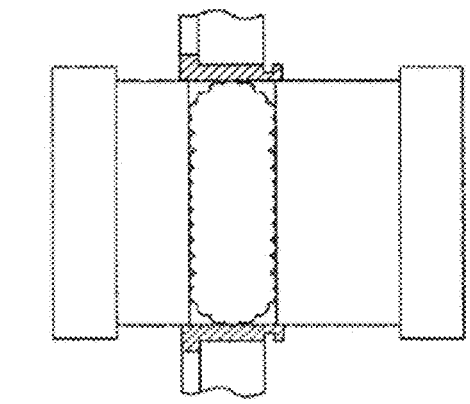
Figure 2A:
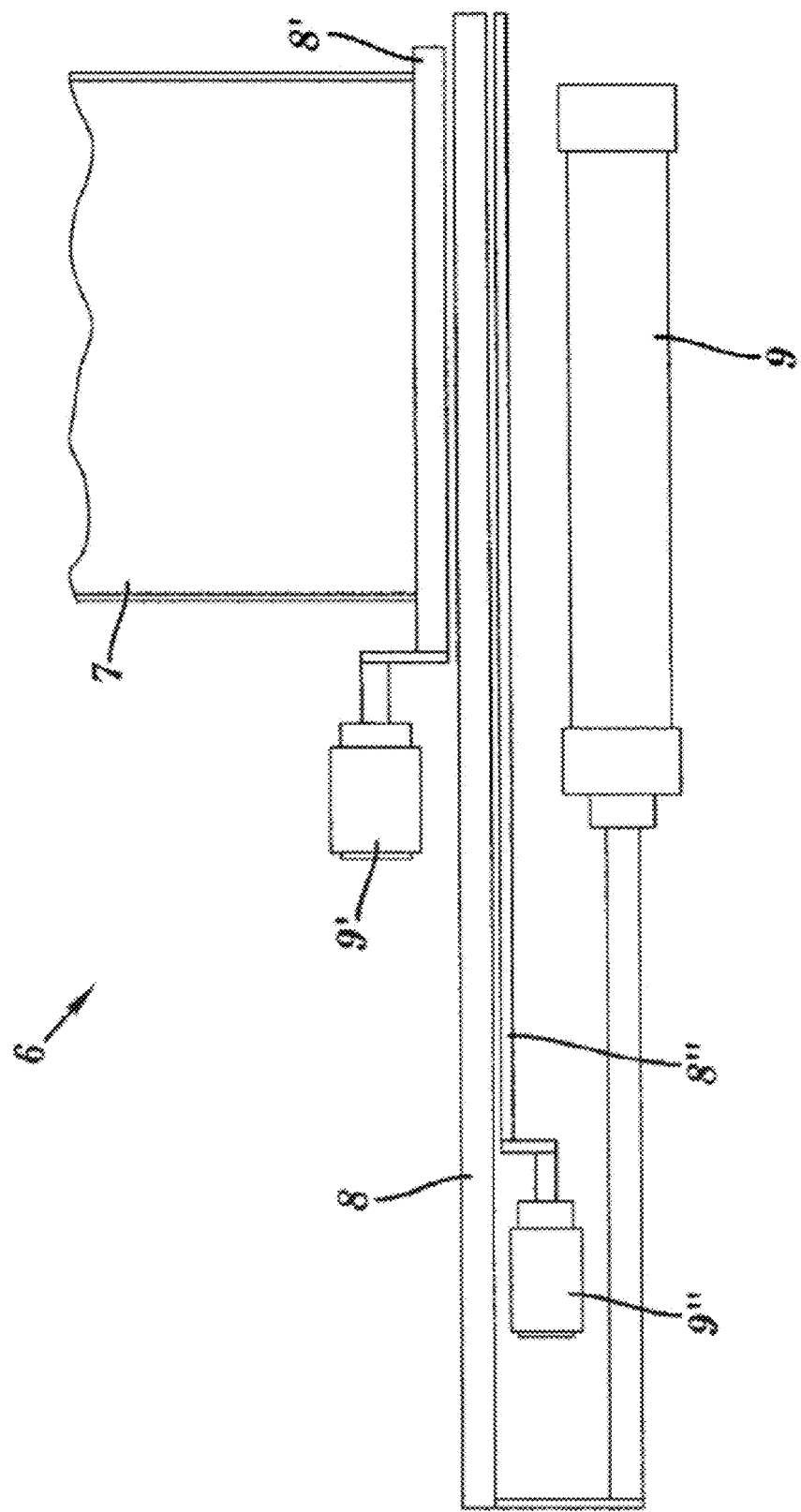
FIGS. 2A-B give side views of a puffing machine arrangement for carrying out the prior-art process steps according to FIGS. 1A-1D.

The raw ingredients 30 may be deposited (e.g., injected, dropped, slided) into the temporarily formed feed cup by the raw material supply system 6 shown in FIG. 2A or with a similar mechanism. The raw ingredients may have been pre-processed, such as chopped or ground to powder or granular forms and/or mixed with condiments, before being supplied to the feed cup. According to one embodiment of the present invention, pre-processing or preparation of the raw ingredients may include pre-heating them to a desired temperature, such as a temperature closer to a subsequent baking temperature than to room temperature. Other examples of pre-processing may include steaming of the raw ingredients which may modify the starch content and add moisture thereto. Apart from addition of moisture, the raw ingredients may be pre-processed to remove moisture.

Figure 2B:
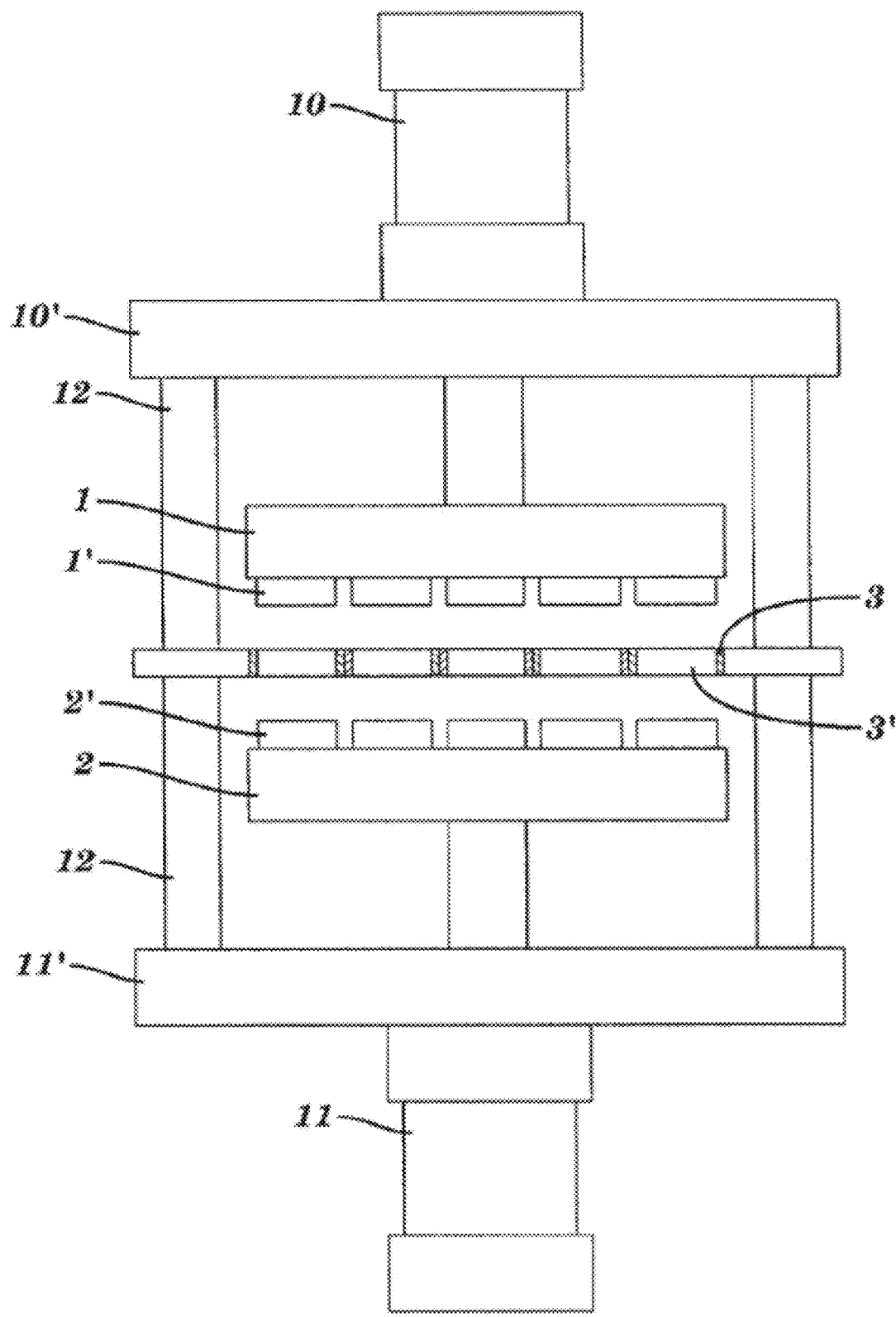
Figure 3:
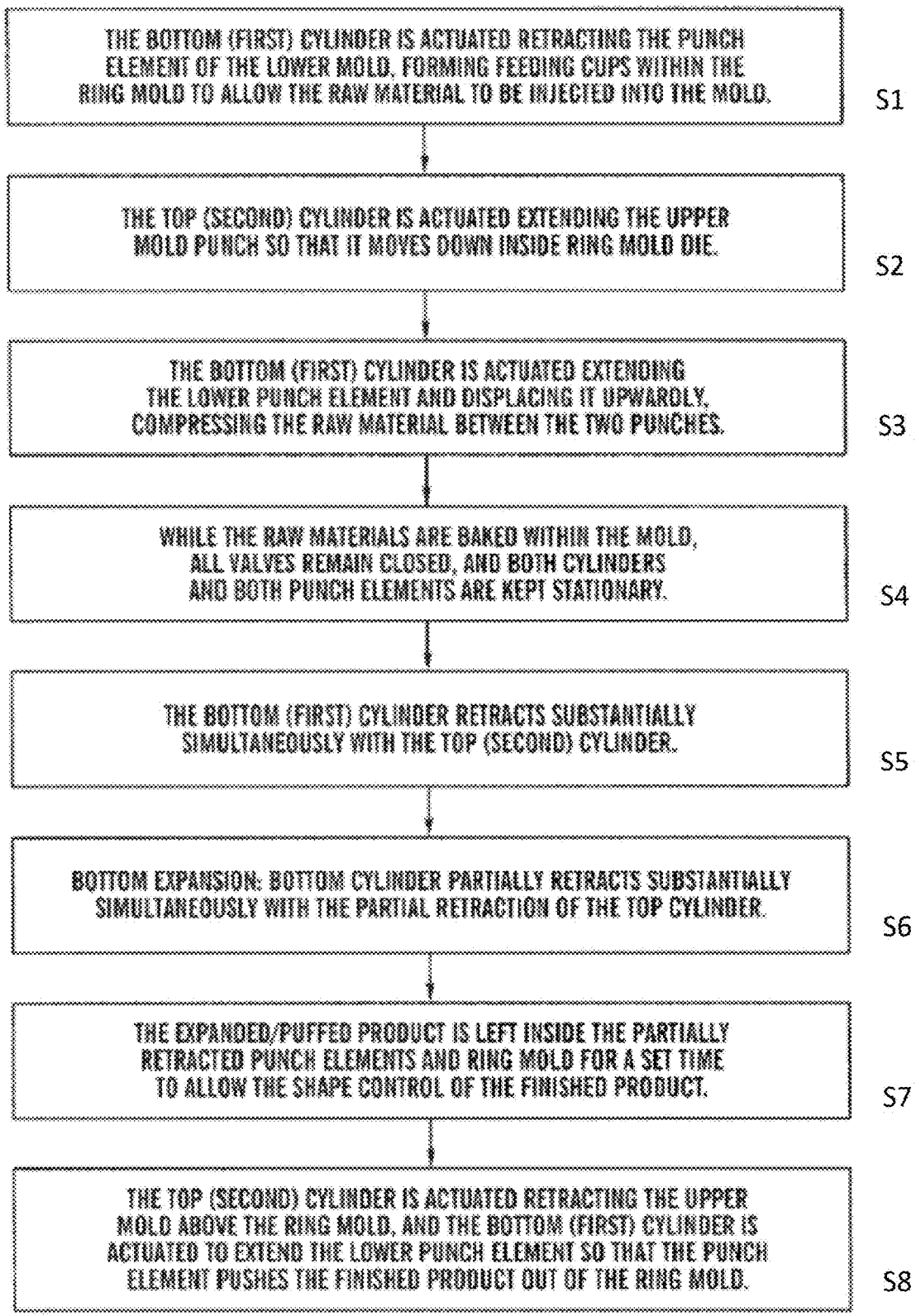
FIG. 3 shows a flow chart illustrating a prior-art process for making puffed products.

Retraction of the lower plate 42 may be achieved through any of a variety of actuation means. For example, the lower plate 42 may be coupled to, and directly driven by, at least one hydraulic cylinder such as shown in FIG. 2B and in more detail in FIG. 5 described below. The extent of the lower plate 42's retraction may depend on the amount of the raw ingredients 30: if the raw ingredients require more space inside the feed cup, then the lower plate 42 should be lowered further or deeper within the ring mold 43.

In Step S404, the upper plate 41 may be moved down towards the lower plate 42 which has the raw ingredients 30 thereon.

Figure 5:
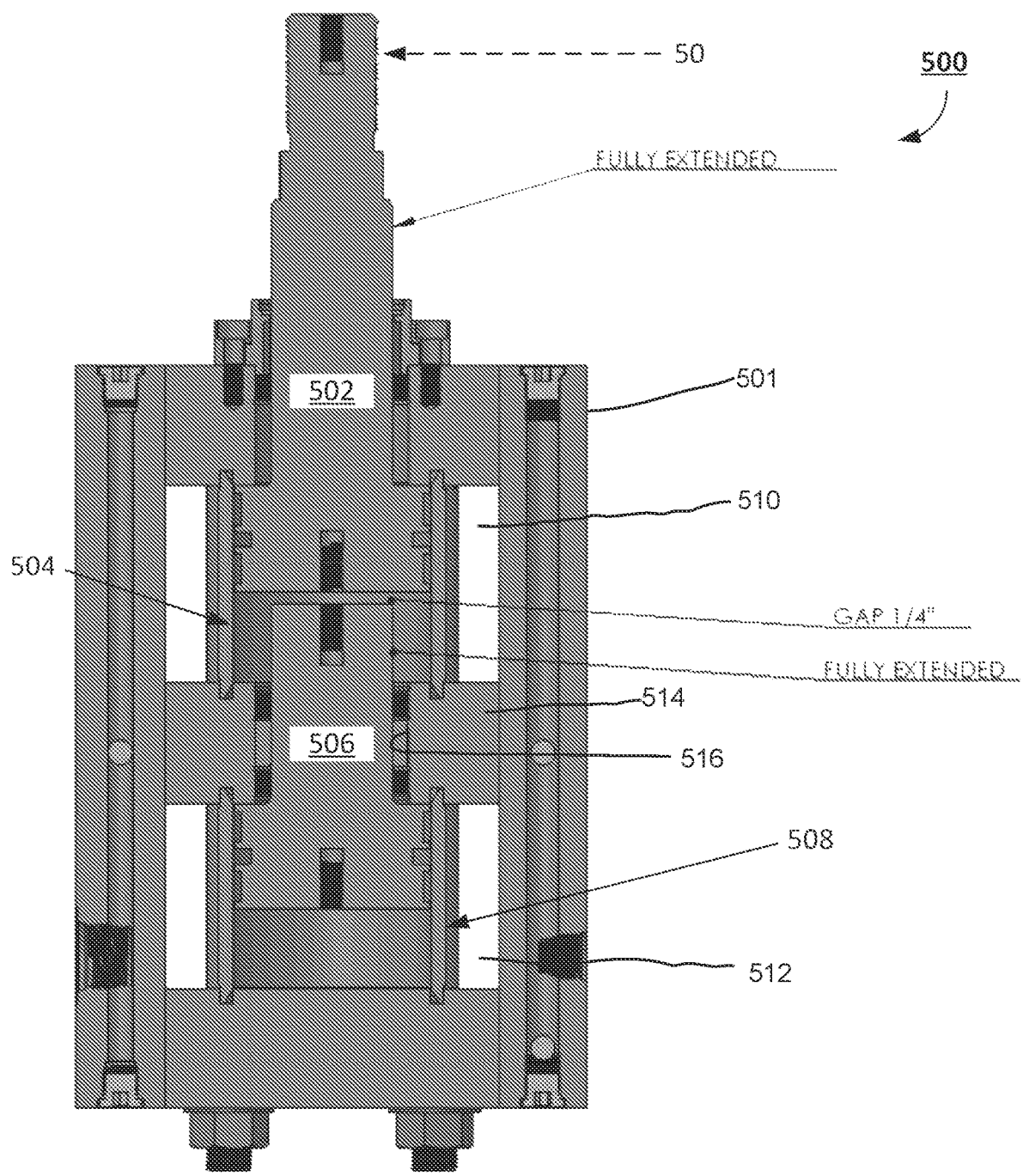
FIG. 5 shows a cross-sectional view of a hydraulic drive component in a first exemplary configuration according to one embodiment of the present invention.

Similar to the movement of the lower plate 42, the upper plate 41 may be moved through any of a variety of actuation means. For example, the upper plate 41 may also be coupled to, and directly driven by, at least one hydraulic cylinder such as shown in FIG. 2B and FIG. 5.

In Step S406, the lower plate may be moved up at substantially the same time as (or before or after) the lowering of the upper plate 41 in Step S404. As a result, the raw ingredients may be spread between and compressed by the upper and lower plates. According to some embodiments of the present invention, the pressure applied by the two mold plates may be controlled by coordinating their respective actuation means such as hydraulic pressures of corresponding driving cylinders.

Then, in Step S408, the mold plates 41 and 42 are held in place and heated in order to bake the raw ingredients 30 at a first pressure and a first temperature.

According to embodiments of the present invention, the mold plates 41 and 42 may be heated to desired temperature(s) based on a number of methods. For example, heating elements may be attached to or embedded within the mold plates 41 and 42 respectively and dynamically controlled based on precise measurements of their surface temperatures. Real-time sensing of the mold plates' surface temperatures may allow continuous, precise adjustments of the heating elements' thermal inputs to the raw ingredients.

The duration of the baking in Step S408 may be a fixed number of seconds, for example, based on empirical data obtained from processing the same raw ingredients. Alternatively, the baking may be ended based on detection of changes in temperature and/or pressure in or near the mold cavity. For example, the detected onset of more rapid increase in temperature and/or the plateauing of pressure increase might provide the cue to end or wind down Step S408.

The baking temperature, duration, and applied pressure may have significant effects on the moisture level and texture of the resulting food product. According to some embodiments of the present invention, temperatures of the mold plates may vary generally between 200 and 320° C., and more preferably between 220 and 260° C.; while the baking duration may vary generally from 0.25 to 10 seconds, and more preferably between 1.0 and 2.5 seconds. The limits to the baking temperature and time are chosen to prevent under-cooking and over-cooking (or burning) of the ingredients; and the multiple-press concept according to embodiments of the present invention widens these limits significantly. For example, while a certain product will burn after being baked at 230° C. for 2 seconds, it may be possible to bake the same product at 230° C. three times for one second each time. The latter (multi-press) process may create an end product with a crispier texture and lower moisture content. Due to the very short baking time, the pressure applied to the mold plates becomes important, including both the amount of pressure, the duration of the pressure, and the speed at which the pressure is applied. Therefore, according to some embodiments, it may be desirable to equip each apparatus or related hydraulic system with a flow control valve (e.g., with a needle-controlled orifice) in order to adjust the application of pressure more precisely.

Next, in Step S410, the top plate 41 may be retracted (i.e., raised) to open up the mold cavity. In the alternative or in addition, the lower plate 42 may be retracted (i.e., lowered) to achieve a same or similar effect. The mold plate movement(s), creating more space in the mold cavity, release the steam or vapor suddenly from the mold cavity, thereby causing the now baked raw ingredients to rapidly expand.

According to some embodiments of the present invention, the retraction of one or both mold plates may be controlled such that the expansion of the baked raw ingredients is essentially unconstrained by the dimensions of the mold cavity. That is, the mold plate(s) may be retracted far enough and fast enough so as to allow the expansion to reach its maximum extent possible. According to other embodiments, the mold plate(s) need not be retracted so far or so fast as to permit the fullest possible expansion. Instead, the mold plate retraction may only permit the expansion to a fraction (e.g., ⅓, ½, or ¾) of its full potential. According to some embodiments, Step S410 may be configured to allow some dwell time in order to allow the desired amount of expansion to be achieved.

At the end of Step S410, the raw ingredients 30 have been converted (through compression, baking, and expansion) into a first intermediate food product 31.

In Step S412, the top plate 41 may again be moved down relative to the lower plate 42 (or vice versa) to compress the first intermediate food product 31. As a result, the puffed shape of the first intermediate food product 31 may be substantially flattened.

In one alternative embodiment of the present invention, additional ingredients, condiments, and/or flavoring may be optionally added to the mold cavity during Step S412. In another alternative embodiment, the upper plate 41 may be replaced by another upper plate of a different shape or surface profile or modified by an attachment to achieve a same or similar effect.

In Step S414, the mold plates 41 and 42 may be held in place and heated in order to bake the now compressed, first intermediate food product 31 at a second pressure and a second temperature.

Similar to Step S408, the mold plates 41 and 42 may be heated to desired temperature(s) based on a number of methods, such as the use of heating elements attached to or embedded within the mold plates 41 and 42 respectively and dynamically controlled based on real-time feedback. The duration of the baking in Step S414 may similarly be either a fixed amount based on empirical data or dynamically determined based on detection of changes in temperature and/or pressure in or near the mold cavity. Typically, the second baking duration and pressure may be different from corresponding parameters for the previous baking step (S408).

In Step S416, the top plate 41 may be fully retracted (i.e., raised) to allow release of additional steam or vapor from the mold cavity, thereby causing the now compressed and baked first intermediate food product 31 to expand.

In Step S418, the process may be paused for a period of time (e.g., a few seconds) to allow the first intermediate food product 31 to fully expand and take a final shape.

At the end of Step S418, the first intermediate food product 31 have been converted (through the second cycle of compression, baking, and expansion) into a final food product 32.

According to alternative embodiments of the present invention, what is produced at the end of Step S418 may be merely a second intermediate food product. Optionally, the process may loop back to Step S412 to repeat at least one more cycle of compression, baking, and expansion to the second intermediate food product before yielding a final food product 32.

As mentioned above, a third cycle or additional cycles may, among other things, extend the limits of temperature, time, and pressure and offer more flexibilities and capabilities for processing a wide variety of raw ingredients and for achieving final food products of desired characteristics. For example, some whole beans and grains cannot be crushed sufficient in a single press, while a multiple-press method may transform those ingredients more fully—which may be especially important for the creation of baby food. With the ability to compress and bake the ingredients multiple times, the final food product may have a crispier texture, adopt a different shape/profile, and contain less harmful microscopic organisms.

Finally, in Step S420, the bottom plate 42 may be moved up for extraction of the final food product 32. For example, the bottom plate 42 may be raised to be flush with (or slightly above) the top surface of the ring mold 43, whereupon the final food product 32 may be pushed or blown off into a discharge chute or another collection receptacle.

At the completion of Step S420, the process may loop back to Step S402 to retract the lower plate 42 and start another round of making puffed food products.

As may be appreciated by those skilled in the art, the steps of the exemplary process may be at least partially automated with electronically controlled components and/or a microprocessor, microcontroller, or microcomputer. For example, an apparatus according to an embodiment of the present invention may include a control unit coupled to a driving system, a raw material supply system, and at least one heatable mold having at least one movable mold element connected to the driving system. The control unit may preferably be programmable to electronically control the raw material supply system to input ingredients into the heatable mold, to cause the driving system to position the at least one moveable mold element, and to bake the ingredients and/or intermediate product(s), all according to the process steps illustrated in FIGS. 4A-4B.

As may be appreciated by those skilled in the art, each diagram of mold elements corresponding to a method step shown in FIGS. 4A-4B represents one production unit of a mold assembly in a larger manufacturing apparatus such as partially shown in FIGS. 2A and 2B.

It should be noted that the mold assemblies shown in the drawings are exemplary only and many of their aspects may be designed or configured differently to accommodate manufacturing needs for different ingredients and final food products. For example, although the upper and lower punch elements or mold plates are shown as having flat food-contacting surfaces in parallel to each other, they can have other surface profiles and/or relative configurations, such as grooves or slots, concave, convex, or wavy contours, or complementary profiles. In addition, the ring dies may have other, non-circular shapes such as triangle, hexagon, octagon, square, or rectangle. Or, the punch elements and ring dies may be easily replaced with components having the alternative designs. Exemplary shapes of the mold plates and ring dies may include but are not limited to: French fries, gold fish, star, tear drop, cloud, heart, oval, and dog bone.

According to embodiments of the present invention, the process for making food products, such as exemplarily illustrated in FIGS. 4A-4B, relies on the proper operations of a driving system, typically hydraulic powered, to move the mold element 41 and/or mold element 42 to desired positions in order to compress, or cause expansion of, the raw ingredients or intermediate food products during specified steps of the process. The inventor of the present invention recognizes that, in order to ensure the quality and consistency of the food products made from the above-described process as well as the efficiency of the process, it would be desirable not only to actuate and drive the hydraulic cylinders with speed and accuracy but also to maintain the consistency and repeatability of at least some of the compression or expansion steps.

Accordingly, an innovative process is need to provide improved configurations and control of hydraulic drive cylinder(s) to more swiftly and precisely apply pressures to the mold elements. For example, in order to drive a first hydraulic piston to move a movable mold element to a desired position, a second hydraulic piston (or another mechanism) may be positioned to set up an adjustable hard-stop based on the desired position. Then, at the proper compression or expansion step, the first hydraulic piston may rapidly drive the moveable mold element to stop at precisely the desired position.

Referring to FIG. 5, there is shown a cross-sectional view of a hydraulic drive component 500 in a first exemplary configuration according to one embodiment of the present invention.

The component 500 may include hydraulic cylinders and pistons at least partially enclosed in a housing 501. The housing 501 includes an axial wall 514 having a through-hole 516. The housing also includes a first hydraulic cylinder 504 that, in conjunction with the axial wall 514, defines a first annular chamber 510 and a second hydraulic cylinder 508 that, in conjunction with the axial wall 514, defines a second annular chamber 512 spaced from the first annular chamber 510. A first hydraulic piston 502 may slide within a first hydraulic cylinder 504; and a second hydraulic piston 506 may slide within a second hydraulic cylinder 508. A portion of the second hydraulic piston 506 extends through the through-hole 516. The component 500 may be used to move a mold element, such as the upper mold plate 41 and the lower mold plate 42 shown in FIGS. 4A-4B, as one end (50) of the first hydraulic piston 502 may be attached or coupled to the mold element.

For example, with the component 500 in the orientation as shown in FIG. 5, the piston 502 may be attached to the lower mold plate 42 to move it up or down with respect to the ring mold element 43 as called for by the steps illustrated in FIGS. 4A-4B. Similarly, with the component 500 vertically flipped as compared to its orientation shown in FIG. 5, the piston 502 may be attached to the upper mold plate 41 to move it up or down with respect to the ring mold element 43 as called for by the steps illustrated in FIGS. 4A-4B.

In particular, FIG. 5 shows both pistons 502 and 506 to be fully extended. That is, both pistons have traveled to, and stopped at, the end of their respective cylinders 504 and 508. As a result, any mold element attached to the first piston 502 has been moved to the farthest point away from the component 500.

This exemplary configuration may be adopted for the piston 502 to position the top plate 41 in Step S404 in FIG. 4A, where the top plate 41 moves to the end of its stroke to start the process of making a puffed food item. This exemplary configuration may also be adopted for the piston 502 to position the bottom plate 42 in Step S420 in FIG. 4B, where the bottom plate 42 moves to the end of its stroke to extract the final food product 32.

In this exemplary configuration of FIG. 5, there may be a quarter-inch gap between the bottom of the piston 502 (when fully extended) and the tip of the fully extended piston 506. Thus, it is the end of stroke of the first cylinder 504 that provides a hard-stop for the fully extended position of the piston 502. In addition, the fully extended position of the piston 506 sets up another hard-stop for the retraction of the piston 502, as illustrated in FIG. 6.

Figure 6:
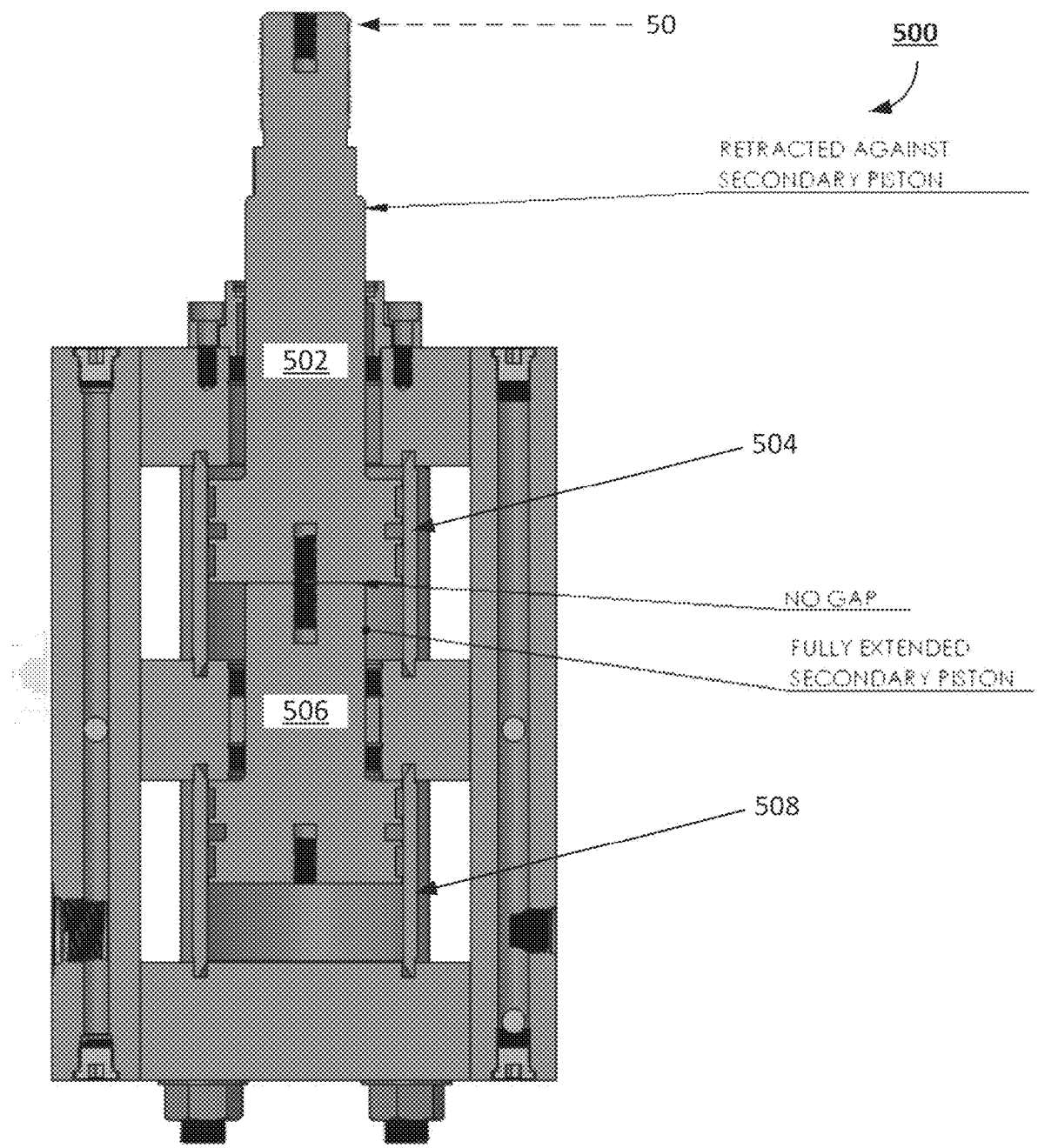
FIG. 6 shows a cross-sectional view of a hydraulic drive component in a second exemplary configuration according to one embodiment of the present invention.

Referring to FIG. 6, there is shown a cross-sectional view of the hydraulic drive component 500 in a second exemplary configuration according to one embodiment of the present invention.

In particular, FIG. 6 shows the piston 506 to remain fully extended while the piston 502 is retracted with its bottom rested against the tip of the piston 506. That is, the piston 502 has traveled downward to, and stopped by, the piston 506. As a result, any mold element attached to the first piston 502 has been moved away from the previous location and towards the component 500.

This exemplary configuration may be adopted for the piston 502 to position the top plate 41 in Step S410 in FIG. 4A, where the top plate 41 is retracted, after the baking step S408, to open up the mold cavity to cause rapid expansion of the now baked raw ingredients. This exemplary configuration may also be adopted for the piston 502 to position the top plate 41 in Step S416 in FIG. 4B, where the top plate 41 is fully retracted to cause expansion of the now compressed and baked first intermediate food product 31. Similarly, this exemplary configuration may be adopted for the piston 502 to position the bottom plate 42 in both steps S410 and S416, to likewise retract the bottom plate 42 to accommodate expansions.

In this exemplary configuration of FIG. 6, there may be no gap between the bottom of the piston 502 (when fully retracted) and the tip of the fully extended piston 506. That is, the piston 506 serves to provide a hard-stop for the retraction of the piston 502, and this is an adjustable hard-stop because the piston 506 may be moved to different positions to thereby stop the retraction of the piston 502 to different extent. An example of the piston 506 serving as a hard-stop for the piston 502 at another position is shown in FIG. 7.

Figure 7:
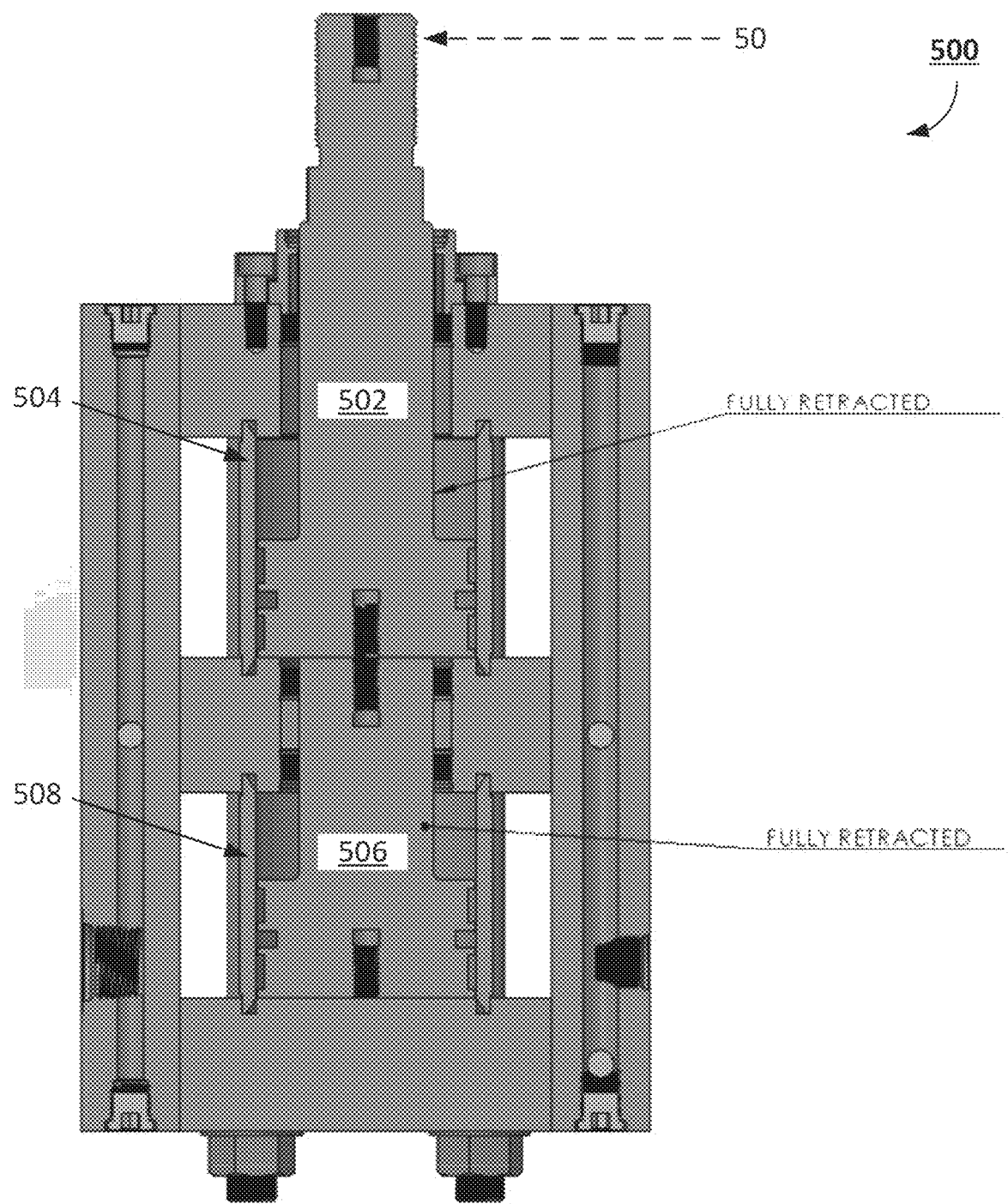
FIG. 7 shows a cross-sectional view of a hydraulic drive component in a third exemplary configuration according to one embodiment of the present invention.

Referring to FIG. 7, there is shown a cross-sectional view of the hydraulic drive component 500 in a third exemplary configuration according to one embodiment of the present invention.

In particular, FIG. 7 shows both pistons 502 and 506 to be fully retracted. That is, both pistons have traveled to, and stopped at, the other end of their respective cylinders 504 and 508. As a result, any mold element attached to the first piston 502 has been moved to the closest point towards the component 500.

This exemplary configuration may be adopted for the piston 502 to position the top plate 41 in Step S420 in FIG. 4B, where the top plate 41 is fully retracted to allow extraction of the final food product. This exemplary configuration may also be adopted for the piston 502 to position the bottom plate 42 for cleaning—which is a step not shown in FIGS. 4A-4B—where the bottom plate 42 is lowered to its lowest position ("cleaning position") to allow scraping and cleaning of the lower mold plate surface.

In this exemplary configuration of FIG. 7, there may be no gap between the bottom of the piston 502 (when fully retracted) and the tip of the fully retracted piston 506. In effect, the fully retracted position of the piston 506 sets up a hard-stop for the full retraction of the piston 502.

In summary, as shown in FIGS. 5-7, the positioning of a mold element attached or coupled to the first piston 502 may be controlled by a hydraulic driving system with both speed and accuracy thanks to precise configurations of hard-stops. While the hard-stops may be provided by the end of stroke of hydraulic cylinders, such as in FIG. 5, adjustable hard-stops may be set up for the primary piston 502 by positioning and repositioning the secondary piston 506, such as in FIGS. 6-7.

Such adjustable hard-stops, which can be flexibly applied to both the top and bottom mold plates, are advantageous compared to prior art approaches: the adjustable hard-stops can ensure that, when it is time to move a mold plate to a next position, the primary piston 502 attached/coupled thereto can be rapidly driven to where it needs to be, as precisely defined by the hard-stop (e.g., the tip of the secondary piston 506), without any concern about overshooting or undershooting the targeted position.

Figure 8:
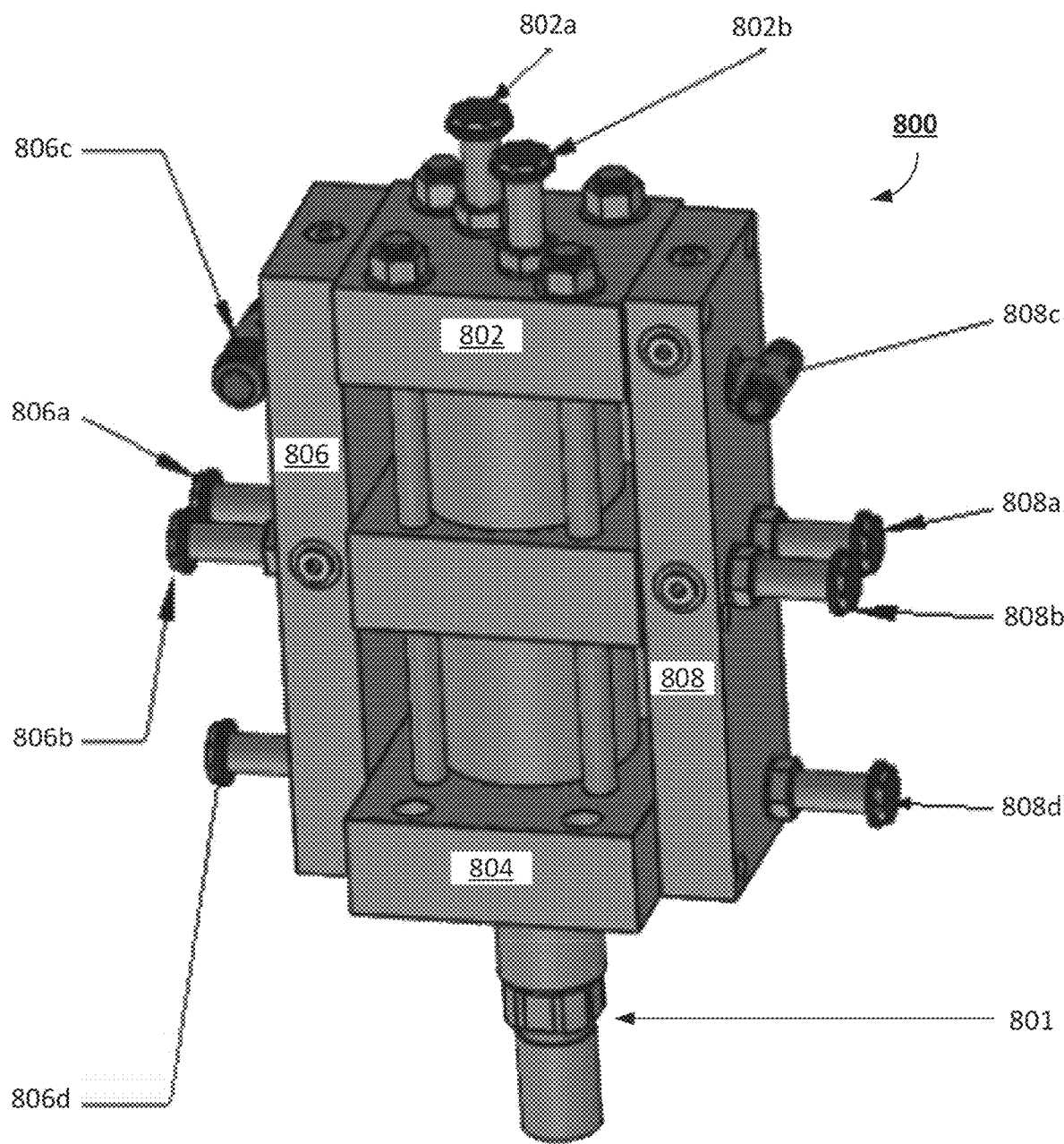
FIG. 8 shows an exemplary hydraulic drive component having two side plates and a top plate functioning as manifolds for control valves according to one embodiment of the present invention.
Figure 9:
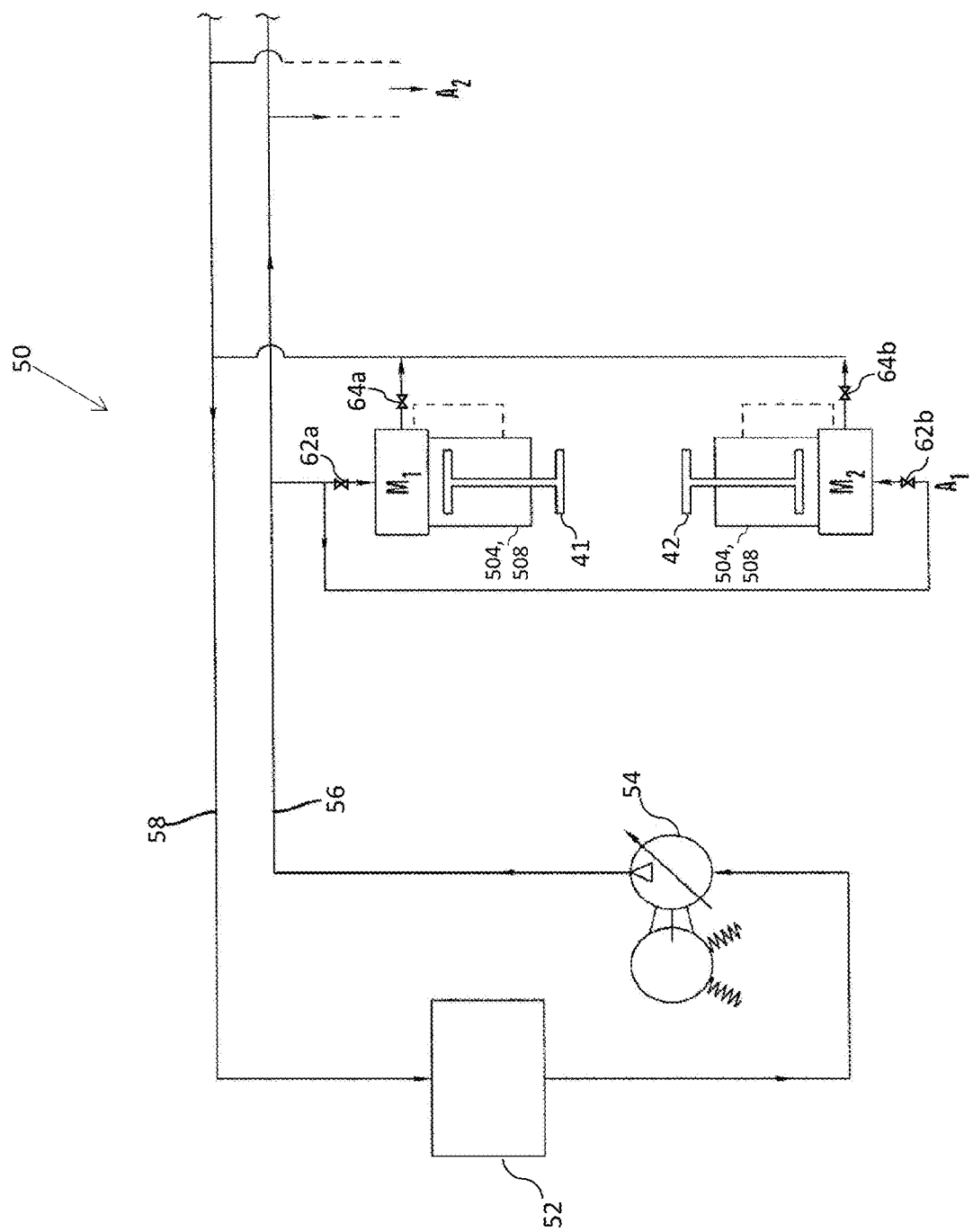
FIG. 9 is a schematic representation of a driving system according to one implementation of the described system.

Referring to FIG. 8, there is shown an exemplary hydraulic drive component 800 having two side plates (806, 808) and a top plate (802) functioning as manifolds for control valves according to one embodiment of the present invention. These side plates (806, 808), the top plate (802), and a bottom plate (804) may collectively form a housing for parts of the hydraulic drive component 800, such as a primary piston and a secondary piston in their respective hydraulic cylinders (which are not shown in FIG. 8 but may be the same as or similar to those shown in FIGS. 5-7). For example, the upper half of the hydraulic drive component may house an upper piston sliding in one hydraulic cylinder while the bottom half of the hydraulic drive component may house a lower piston sliding in another hydraulic cylinder. The lower piston may be the primary piston connected to a shaft 801 that may in turn be attached or coupled to a mold element.

The top plate 802 may include hydraulic valves and/or line connections (802a, 802b) wherein 802a is coupled to a tank line to drive an upper piston (not shown) up and 802b is coupled to a pressure line to drive the upper piston down.

The side plate 806 may include hydraulic valves and/or line connections (806a, 806b, 806d) wherein 806a is coupled to a tank line to drive the upper piston down, 806b is coupled to a tank line to drive a lower piston (not shown) up, and 806d is coupled to a tank line to drive the lower piston down. The side plate 806 may also include a tank line return connection 806c.

Similarly, the side plate 808 may include hydraulic valves and/or line connections (808a, 808b, 808d) wherein 808a is coupled to a pressure line to drive the upper piston up, 808b is coupled to a pressure line to drive the lower piston down, and 808d is coupled to a pressure line to drive the lower piston up. The side plate 808 may also include a pressure line connection 808c.

These hydraulic valves may be activated in coordination to drive the upper and lower pistons, such as pistons 502 and 506 shown in FIGS. 5-7. Typically, a pressure valve and a return valve is simultaneously activated to cause a movement of the corresponding piston in a desired direction.

For example, the simultaneous activation of valves 802b and 806a may cause the top piston to move down; the simultaneous activation of valves 802a and 808a may cause the top piston to move up; the simultaneous activation of valves 808b and 806d may cause the lower piston to move down; and the simultaneous activation of valves 808d and 806b may cause the lower piston to move up.

The two side plates (806, 808) and top plate (802) also function as manifolds which house the eight valves that control both cylinders. One advantage of this design is speed and accuracy, mainly due to the close proximity of the valves to the cylinders. Speed and the control of the speed are important for the production of certain food products in order to create a desired expansion in the end product. Control of the speed and timing is also important for the consistency and repeatability of the expansion cycle which ensures a constant quality of the final food product.

According to a particular implementation, the driving system 50 may comprise: a fluid reservoir 52; a pump 54; a feed line 56 connected to the pump 54 and the fluid reservoir 52; a return line 58 connected to the fluid reservoir; at least one first hydraulic cylinder 504 and at least one second hydraulic cylinder 508 connected to the feed line 56 and to the return line 58, the at least one first and second hydraulic cylinders 504, 508 being connected to and moving the at least one movable mold element 41, 42 into and out of the mold cavity; a plurality of valves including at least one feed valve 62a, 62b connected in the feed line 56 and at least one return valve 64a, 64b connected in the return line 58; and a unit that controls the operation of the feed 62a, 62b and return 64a, 64b valves to control the flow of fluid to the at least one first and second hydraulic cylinders 504, 508 and back to the reservoir 52.

As those skilled in the art may appreciate, although the foregoing description uses hydraulic cylinders and pistons in the exemplary driving systems and processes, the above-described adjustable hard-stops may be set up and/or configured through non-hydraulic means such as pneumatic or other mechanical components.

In order to address various issues and advance the art, the entirety of this application (including the Cover Page, Title, Headings, Field, Background, Summary, Brief Description of the Drawings, Detailed Description, Claims, Abstract, Figures, Appendices and/or otherwise) shows, by way of illustration, various exemplary embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. That alternative embodiments may not have been presented for a specific portion of the innovations or that further undescribed alternative embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized, and functional, logical, operational, organizational, structural and/or topological modifications may be made without departing from the scope and/or spirit of the disclosure. Thus, all examples and/or embodiments are deemed to be non-limiting throughout this disclosure. Also, no inference should be drawn regarding those embodiments discussed herein relative to those not discussed herein other than it is as such for purposes of reducing space and repetition. In addition, the disclosure includes other innovations not presently claimed. Applicant reserves all rights in those presently unclaimed innovations, including the right to claim such innovations, file additional applications, continuations, continuations-in-part, divisions, and/or the like thereof.

What is claimed is:

1. A pressure-molding apparatus for making a food product, comprising:
   at least one heatable mold which defines a mold cavity and has at least one movable mold element;
   a driving system, coupled to the at least one mold element, that is configured to move said at least one mold element to a desired position relative to the mold cavity, the driving system comprising:
   a housing having an axial wall with a through-hole;
   a first hydraulic cylinder that, in conjunction with the axial wall, defines a first annular chamber;
   a second hydraulic cylinder that, in conjunction with the axial wall, defines a second annular chamber spaced from the first annular chamber by the axial wall;
   a first hydraulic piston slidably received within the first hydraulic cylinder;
   a second hydraulic piston slidably received within the second hydraulic cylinder and having a portion extending through the through-hole;
   wherein the position of the first and second hydraulic pistons define at least one adjustable hard-stop based on said desired position and wherein the driving system causes the first hydraulic piston to travel to and be stopped by said at least one adjustable hard-stop;
   a raw material supply system that transports raw materials into the mold cavity; and
   a control unit configured to control at least said driving system, said at least one heatable mold, and said raw material supply system to process said raw material into a puffed food product.

2. The apparatus according to claim 1, wherein said control unit is further configured to:
   (a) cause said raw material supply system to deposit a raw material into said mold cavity;
   (b) actuate said driving system to position said at least one movable mold element with respect to said mold cavity to compress said raw material;
   (c) heat at least a portion of said at least one heatable mold to bake said compressed raw material at a first temperature;
   (d) actuate said driving system to at least partially retract said at least one movable mold element to allow said baked, compressed raw material to expand and take shape into a first intermediate food product;
   (e) actuate said driving system to re-position said at least one movable mold element with respect to said mold cavity to compress said first intermediate food product;
   (f) heat at least a portion of said at least one heatable mold to bake said first intermediate food product at a second temperature; and
   (g) actuate said driving system to at least partially retract said at least one movable mold element to allow said baked, compressed first intermediate food product to expand and take shape into a second intermediate food product;
   wherein at least one of Steps (b), (d), (e), and (g) comprises setting up said at least one adjustable hard-stop and causing said first hydraulic piston to travel to and be stopped by said at least one adjustable hard-stop.

3. The apparatus according to claim 2, wherein said second intermediate food product is retrieved from said at least one heatable mold as a final food product.

4. The apparatus according to claim 2, wherein said first temperature is the same as said second temperature.

5. The apparatus according to claim 1, wherein said at least one adjustable hard-stop is set up by the second hydraulic piston and said control unit is further configured to actuate said driving system to re-position said the second hydraulic piston prior to moving said the first hydraulic piston towards said at least one adjustable hard-stop.

6. The apparatus according to claim 1, wherein said at least one heatable mold further comprises a ring mold element, said ring mold element slidably receives said at least one mold element in a fluid-tight manner.

7. The apparatus according to claim 1, wherein said driving system comprises:
   a fluid reservoir;
   a pump;
   a feed line connected to the pump and the fluid reservoir;
   a return line connected to the fluid reservoir;
   the first hydraulic cylinder and the second hydraulic cylinder being connected to the feed line and to the return line, the first hydraulic cylinder being connected to and moving said first hydraulic piston, and the second hydraulic cylinder moving the second hydraulic piston to set up said at least one adjustable hard-stop for the first hydraulic piston;
   a plurality of valves including at least one feed valve connected in the feed line and at least one return valve connected in the return line; and
   a unit that controls the operation of the feed and return valves to control the flow of fluid to said first hydraulic cylinder and said second hydraulic cylinder and back to the reservoir.

8. The apparatus according to claim 1 wherein some of the portion of the second piston extending through the through-hole extends into the first hydraulic cylinder.

9. The apparatus according to claim 1 wherein the at least one adjustable hard stop includes the portion of the second piston extending through the through-hole.

10. A system for making a food product, comprising:
   one or more pressure-molding apparatuses, each of the pressure-molding apparatuses including:
   at least one heatable mold which defines a mold cavity and has at least one movable mold element;
   a driving system, coupled to the at least one mold element, that is configured to move said at least one mold element to a desired position relative to the mold cavity, the driving system comprising:
   a housing having an axial wall with a through-hole;
   a first hydraulic cylinder that, in conjunction with the axial wall, defines a first annular chamber;
   a second hydraulic cylinder that, in conjunction with the axial wall, defines a second annular chamber spaced from the first annular chamber by the axial wall;
   a first hydraulic piston slidably received within the first hydraulic cylinder;
   a second hydraulic piston slidably received within the second hydraulic cylinder and having a portion extending through the through-hole;
   wherein the position of the first and second hydraulic pistons define at least one adjustable hard-stop based on said desired position and wherein the driving system causes the first hydraulic piston to travel to and be stopped by said at least one adjustable hard-stop;
   a raw material supply system that transports raw materials into the mold cavity; and a control unit configured to control at least said driving system, said at least one heatable mold, and said raw material supply system to process said raw material into a puffed food product.

11. The system according to claim 10, wherein said control unit is further configured to:
(a) cause said raw material supply system to deposit a raw material into said mold cavity;
(b) actuate said driving system to position said at least one movable mold element with respect to said mold cavity to compress said raw material;
(c) heat at least a portion of said at least one heatable mold to bake said compressed raw material at a first temperature;
(d) actuate said driving system to at least partially retract said at least one movable mold element to allow said baked, compressed raw material to expand and take shape into a first intermediate food product;
(e) actuate said driving system to re-position said at least one movable mold element with respect to said mold cavity to compress said first intermediate food product;
(f) heat at least a portion of said at least one heatable mold to bake said first intermediate food product at a second temperature; and
(g) actuate said driving system to at least partially retract said at least one movable mold element to allow said baked, compressed first intermediate food product to expand and take shape into a second intermediate food product;
wherein at least one of Steps (b), (d), (e), and (g) comprises setting up said at least one adjustable hard-stop and causing said first hydraulic piston to travel to and be stopped by said at least one adjustable hard-stop.

12. The system according to claim 11, wherein said second intermediate food product is retrieved from said at least one heatable mold as a final food product.

13. The system according to claim 11, wherein said first temperature is the same as said second temperature.

14. The system according to claim 11, wherein said at least one adjustable hard-stop is set up by the second hydraulic piston and said control unit is further configured to actuate said driving system to re-position said second hydraulic piston prior to moving said first hydraulic piston towards said at least one adjustable hard-stop.

15. The system according to claim 10, wherein said at least one heatable mold further comprises a ring mold element, said ring mold element slidably receives said at least one mold element in a fluid-tight manner.

* * * * *